United States Patent Office 2,865,223
Patented Dec. 23, 1958

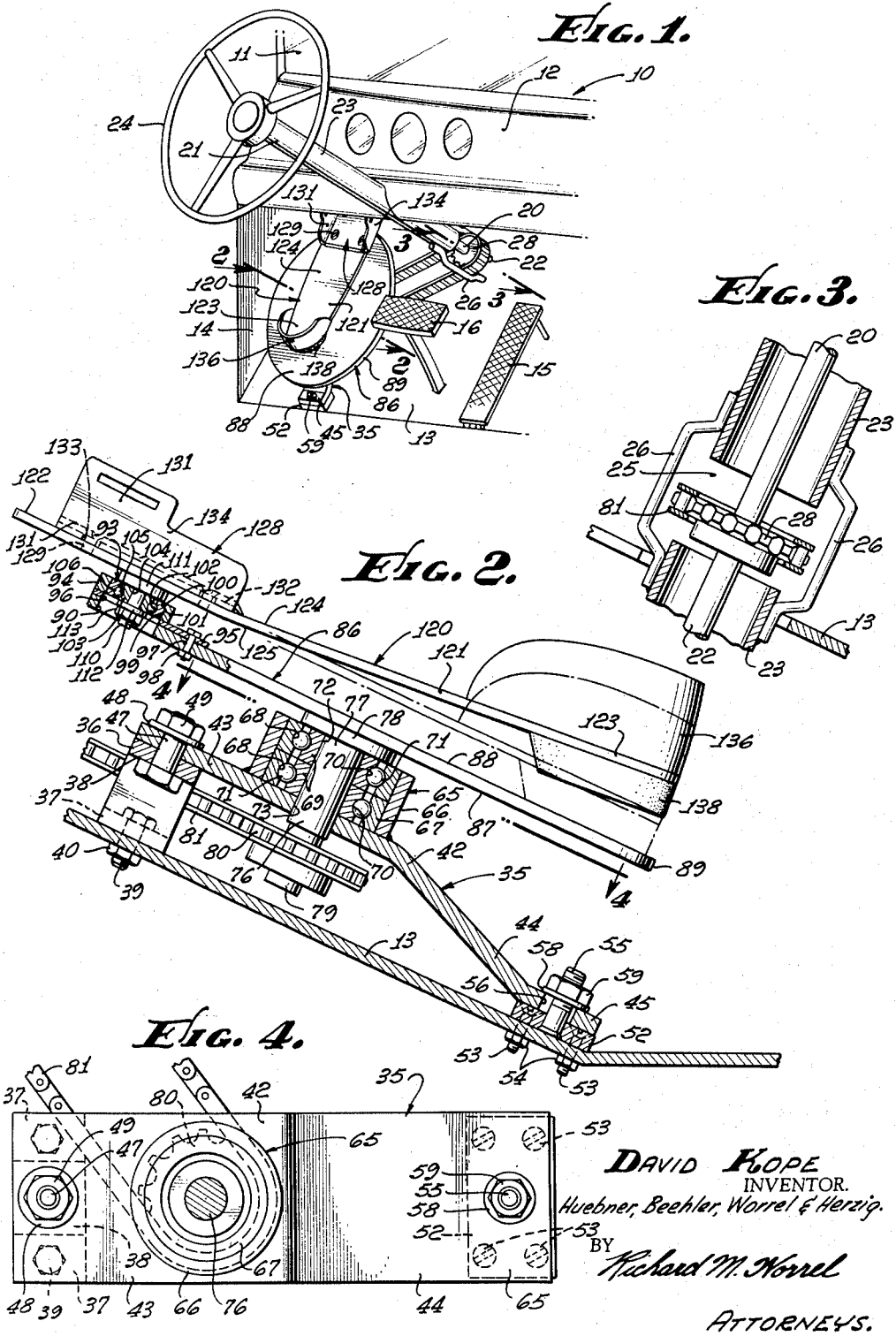

2,865,223

VEHICLE STEERING DEVICE

David Kope, Reedley, Calif.

Application October 8, 1956, Serial No. 614,495

11 Claims. (Cl. 74—494)

The present invention relates to a vehicle steering device and more particularly to an auxiliary foot controlled steering apparatus for vehicles.

Many people who have lost a hand or arm or are afflicted with polio, cerebral palsy, arthritis, heart conditions, and other maladies, are frequently left without use and/or control of their hands, arms, or the upper extremities of their bodies. As a result, persons crippled in this manner are frequently unable successfully to operate an automobile or other vehicle principally because they cannot grasp and manipulate a conventional steering wheel. In other cases where the wheel can be held and turned, there is insufficient strength and coordination to control the wheel with adequate dexterity to meet the demands of modern driving conditions, for example, in crowded traffic, for parking, turning corners, and the like.

Even with people who have normal and full use of their arms and hands and who are quite competent to handle a steering wheel, it is sometimes desirable to free the hands for performing other tasks while driving. Instances where this may be true occur with mail and paper carriers, delivery men, taxi drivers, and even on occasion with average motorists.

Accordingly, it is an object of the present invention to provide an apparatus for steering vehicles by means of foot control.

Another object is to enable people lacking use and control of their arms, hands, or upper body extremities, to operate automotive vehicles.

Another object is to enable the operation of a vehicle while simultaneously freeing the hands for performing other tasks.

Another object is to provide a foot controlled steering device which is fully as effective in steering a vehicle as are conventional hand controlled steering wheels.

Another object is to provide a foot controlled steering device which can be incorporated into existing automotive vehicles with a minimum of variation or interference with the parts of the vehicles.

Another object is to provide a foot controlled steering device which enables the user thereof to operate the brake of the vehicle with the same foot that operates the steering device so that the other foot is free for accelerator control.

Another object is to provide a foot controlled steering device which is as fully effective in negotiating partial or full turns as in providing sensitive steering control such as is needed in heavy or high speed traffic.

Another object is to provide a foot controlled steering device which satisfies the requirements of motor vehicle laws.

Other objects are to provide a foot steering device of the nature described which is simple in construction, easy to operate, economical to install, dependable in operation, durable in form, generally adapted to existing vehicles, and which is highly effective for accomplishing its intended purposes.

These and other objects will become more fully apparent upon reference to the following description.

In the drawing:

Fig. 1 is a fragmentary perspective view of the interior of a vehicle looking forwardly from a driver's seat therein and illustrating the present invention as mounted in the vehicle.

Fig. 2 is a fragmentary, somewhat enlarged vertical section taken on line 2—2 of Fig. 1 and showing a foot receiving slipper in two positions of operation.

Fig. 3 is a fragmentary, somewhat enlarged longitudinal section taken on line 3—3 of Fig. 1.

Fig. 4 is a fragmentary, cross section taken on a plane at a position represented by line 4—4 of Fig. 2.

Referring more particularly to the drawing, an automobile, typifying the vehicle with which the present invention may be employed, is generally indicated by the numeral 10. As illustrated, the auto provides a front windshield 11, a dashboard 12, a forwardly upwardly inclined floor board 13, and a side panel 14. An accelerator pedal 15, and a brake pedal 16 are mounted on the floor board for movement between applied and retracted positions in the well-known manner.

An elongated, main steering shaft 20 is rotatably mounted in the auto 10 having an upper end 21 and a lower end extended downwardly through the floor board 13. A cylindrical steering column 23 encloses the steering shaft, and a steering wheel 24 is secured to the upper end of the shaft for imparting rotation thereto upon manual turning of the wheel. The column has an annular break 25 adjacent to the floor board exposing the steering shaft, and braces 26 are extended longitudinally between portions of the column in bridging relation to the break. A driven sprocket 28 is secured to the shaft in the broken away area of the column for rotatable movement with the shaft.

A substantially T-shaped support bracket 35 is mounted in the auto 10 laterally adjacent to the brake pedal 16. At this point it is to be noted that the bracket is conveniently installed in vehicles having automatic transmissions, and not requiring a clutch, inasmuch as the bracket may be positioned in the place normally reserved for the clutch. The bracket includes an upwardly arched, upper cross member 36 disposed transversely of the auto 10 having flanged ends 37 rested flatly against the floor board and a central portion 38 spaced upwardly from the floor board. The upper member is secured to the floor board by bolts 39 extended downwardly through the flanged ends and the floor board, and nuts 40 are screw-threadably tightened on the lower ends of the bolts. The bracket also has a central member 42 disposed longitudinally of the auto and including an upper portion 43 substantially parallel to the floor board and overlying the central portion of the upper member, and a lower downwardly inclined portion 44 having a flanged end 45. A bolt 47 is extended upwardly through the central and upper portions; a washer 48 is placed over the extended end of the bolt; and a nut 49 is screw-threaded on the bolt against the washer.

A rectangular block 52 is secured to the floor board 13 by bolts 53 having heads flush with the upper surface of the block, and by nuts 54 screw-threaded on the bolts. A threaded stud 55 is extended upwardly from the block and held in fixed position therein on the floor board. The flange 45 of the central member 42 of the bracket 35 has an enlarged slot 56 receiving the stud for limited lateral pivotal movement of the central member of the bracket around the upper bolt 47. A washer 58 is placed over the upwardly extended stud and rested against the flanged end 45. An adjustment nut 59 is screw-threadably received on the stud and tightened downwardly against the washer. By loosening the nut 59, the central member of the bracket may be laterally adjusted relative to the steering shaft 20 as will be evident.

A roller ball bearing 65 includes an outer annular housing 66 rigidly secured to the upper portion 43 of the central member 42. Outer races 67 are secured within the housing and provide outer grooves 68. Inner races 69 providing inner grooves 70 are rotatably mounted within the outer races on balls 71 riding in the inner and outer grooves of the races. The inner races provide a bore 72 registering with an aperture 73 in the upper portion of the central member and having an axis substantially parallel to the main steering shaft 20.

An auxiliary steering shaft 76 is rigidly mounted in the bore 72 of the bearing 65 for rotatable movement therein. The auxiliary shaft provides an upper end 77 having a substantially circular mounting disc 78 secured thereto and a lower end 79 downwardly extended through the aperture 73 and into the space between the central member 42 of the bracket 35 and the floor board 13. The lower end of the auxiliary shaft is preferably slightly reduced in diameter for receiving a driving sprocket 80 which is rigidly mounted thereon for rotation therewith. An endless chain 81 is extended around the driving sprocket and the driven sprocket 28 to enable rotation of the main steering shaft 20 in response to rotation of the auxiliary shaft 76.

A substantially circular, flat, foot steering plate 86 is rigidly concentrically secured to the auxiliary shaft 76, preferably by welding the lower surface 87 of the plate to the mounting disc 78. The steering plate also has an upper surface 88 and a circumscribing rim 89. The plate has an opening 90 adjacent to the rim thereof for a purpose to be described.

A roller bearing 93 provides a housing 94 secured to the upper surface 88 of the steering plate over the opening 90 therein. For this purpose a flange 95 having an opening 96 in registry with the opening 90 extends outwardly from the housing, bolts 97 are extended downwardly through the flange and the plate 86, and nuts 98 are screw-threaded on the bolts. The housing has an inner annular concave surface 99 and an outer race 100, providing an outer annular convex surface 101, is mounted within the housing with the convex surface complementarily fitted for universal movement against the concave surface. The outer race also has an annular groove 102. An inner race 103 provides a central bore 104 concentric to the opening 90 but smaller in diameter and an inner groove 105 opposed to the outer groove 102. Balls 106 are fitted in the opposed grooves for enabling rotatable movement of the inner race relative to the outer race with a minimum of friction.

A pin 110 secured in the bore 104 of the inner race 103 provides a circular head 111 above the bearing 94 and a lower threaded end downwardly extended through the opening 90 to a position below the foot steering plate 86. A washer 112 is positioned over the lower end of the pin, and a nut 113 is screw-threaded on the pin against the washer. The pin is thus rotatably mounted in the bearing 94. Further, limited universal or nutational movement of the pin is permitted because of the construction and association of the outer race 100 and the housing 95. During rotation of the pin, therefore, it may also be moved from a position substantially parallel to the auxiliary steering shaft 96 to positions outwardly inclined therefrom.

A foot receiving slipper or holder 120 provides an elongated, substantially longitudinally rigid sole supporting portion 121 having a toe end 122 rigidly secured to the head 111 of the pin 110 and a heel end 123 slightly upwardly angulated relative to the toe end. The sole supporting portion also has an upper surface 124, and a lower surface 125 in opposed spaced relation to the foot steering plate 86. A toe plate 128 is secured on the upper surface of the toe end 122 of the sole supporting portion by means of screws 129. Toe receiving portions 131 provide bottom flanges 132 slidably interposed between the toe plate and the sole supporting portion and having slots 133 receiving the screws 129. The toe receiving portions also have opposed, upwardly extended side flanges 134 in substantially right angular relation to the bottom flanges thereof. In order to accommodate the foot of a user, the toe receiving portions are laterally adjustable inwardly and outwardly relative to the sole portion by loosening the screws 192. An upwardly extended heel receiving member 136 is secured to the heel end 123 of the sole supporting portion. Further, a heel pad 138 of resiliently compressible material, such as rubber, is secured to the lower surface 125 of the sole supporting portion and is downwardly extended therefrom toward the steering plate 86.

*Operation*

The operation of the described embodiment of the subject invention is believed to be readily apparent and is briefly summarized at this point. The auxiliary steering apparatus is first adjusted to suit the convenience and comfort of the operator. Thus, the bracket 35 is preferably positioned on the floor board 13 so that the slipper 120 is at a convenient elevation as well as a convenient lateral position insofar as the user is concerned. The toe receiving portions 131 of the slipper 120 are, of course, laterally adjusted to fit the shoe of the operator so that the foot can be easily slid in and out of the slipper and yet be held snugly in the slipper during operation.

In actual use, a driver takes his position behind the main steering wheel 24 and inserts his left foot into the slipper 120 so that the toe is between the toe receiving portions 131, the sole rests on the sole supporting portion 121, and the heel fits in the heel receiving member 136. Thus positioned, the foot can rotate the pin 110 relative to the foot steering plate 86 and can also tilt the slipper fore, aft and laterally in rolling fashion. When required, the heel pad 138 can be brought to bear against the upper surface 88 of the steering plate by pressing down on the heel to tilt the pin rearwardly. In other respects, the operator positions himself in a conventional manner, that is, so that his right foot can control the accelerator pedal 15 and the brake pedal 16.

By imparting rotation to the steering plate 86 with the ball of the foot during operation of the vehicle, the main steering shaft 20 is rotated through the driving sprocket 80, the chain 81, and the driven sprocket 28. When it is desired to make a turn, the steering plate is rotated in the corresponding direction the necessary amount and if required, may be given one or more complete revolutions, as will be evident.

When driving in heavy traffic or when otherwise requiring sensitive and precise steering control, the heel end 123 of the slipper 120 is pressed downwardly to bring the heel pad 138 frictionally into engagement with the upper surface 88 of the foot steering plate 86. Inasmuch as the plate is now engaged at two points substantially diametrically on opposite sides of the steering axis for the plate, complete control is maintained over rotation of the plate. The plate can be rotated precisely in minute angular increments thereby to transmit small degrees of rotation to the steering shaft 20. After a little practice, the foot of the operator becomes sensitive to the steering mechanism much in the same way as the hands of a driver do in manipulating a conventional steering wheel.

In addition, it is possible to pivot the slipper 120 in a counterclockwise direction around the pin 110, as viewed in Fig. 1, to bring the heel pad 139 into engagement with the brake pedal 16 and then to press the heel end 123 of the slipper downwardly to enable application of the brake. Universal mounting of the pin 110 in the bearing 93 enables this action. This feature is used in particular when operating the auto 10 on a steep grade or hill. For example, when the auto is stopped for a stop slight or on a steep incline, it is ordinarily necessary to manipulate the accelerator pedal 15 and the brake 16 substantially simultaneously. This may require the use of both feet. Inasmuch as the slipper is adapted to engage the brake pedal, an operator employing the foot steering device of the present invention can readily handle such a driving problem.

Although the subject invention is particularly useful and was designed for people not able to operate a vehicle manually, that is by hand, it is to be noted that incorporation of the invention in a vehicle does not interfere with the normal use of the conventional steering wheel 24. Thus, the foot steering device and the steering wheel may be used interchangeably as desired. By loosening the nut 59, the chain 81 may be removed so that the plate 86 will not rotate when using the main steering wheel 24 in the usual way, or when the nut 113 is removed, the slipper 120 can be released from the plate 86 so as not to interfere with normal hand driving although the plate still rotates incident to main steering shaft 20 rotation.

From the foregoing it will be evident that a highly effective device has been provided for steering a vehicle with one foot. In actual practice, this device has been successfully and safely used by a handicapped person unable to operate a vehicle with the regular controls. Although the described individual had not driven in three years, he was able to learn to drive with the subject invention in approximately three and one-half days whereupon he passed a state driving examination with excellent results. It has been found that once accustomed to the foot steering device, a person is able to drive with fully as much confidence as by hand. In certain cases it is even more relaxing than by hand. An important advantage lies in the discovery that the reaction of the foot to sudden emergencies is frequently faster than the reaction of the hands. Not only is the invention useful for disabled persons, but it has utility for vehicle operators who desire to perform additional functions with their hands while simultaneously driving the vehicle. This is of real advantage to rural mail carriers, newspaper deliverers and similar occupations.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a vehicle having a steering mechanism, a shaft rotatably mounted in the vehicle having driving connection to the steering mechanism for operation thereof incident to rotation of the shaft, a steering member rigidly connected to the shaft and radially extended therefrom, and a foot receiving member rotatably journaled in the steering member in radially spaced relation to the shaft for rotation independently of the steering member about an axis substantially parallel to the shaft thereby to rotate the shaft in response to application of turning moment on the steering member by the foot receiving member.

2. In a vehicle having a steering mechanism, a shaft rotatably mounted in the vehicle having driving connection to the steering mechanism for operation thereof incident to rotation of the shaft, a steering plate rigidly connected to the shaft and radially extended therefrom, and a foot receiving member having an end portion rotatably connected to the steering plate in radially spaced relation to the shaft and being independently rotatable, with respect to the plate, around an axis substantially parallel to the shaft for effecting wide angle rotation of the steering plate and an opposite end portion frictionally engageable with the plate in spaced relation to the pivoted end portion to enable concurrent rotation of the foot receiving member and the steering plate for controllable rotation of the shaft in minute angular increments.

3. An auxiliary foot controlled steering apparatus for a vehicle having a steering mechanism comprising an auxiliary steering shaft rotatably mounted on the vehicle having driving connection to the steering mechanism for operation thereof incident to rotation of the shaft, a steering plate rigidly connected to the shaft for rotation therewith and radially extended therefrom, a foot receiving member having a toe end rotatably connected to the steering plate for rotation independently of the plate about an axis substantially parallel to the auxiliary shaft to enable 360° rotation of the plate incident to application of turning moment to the plate at the toe end of the foot receiving member and while maintaining said foot receiving member in predetermined attitude, and a heel portion of resiliently compressible material frictionally engageable with the plate at a position on the opposite side of the axis of rotation of the plate from the toe end of the foot receiving member to enable carefully controlled rotation of the steering plate in minute angular increments.

4. In a vehicle having a floor board, an elongated rotatable main steering shaft downwardly extended through the floor board, and a steering wheel connected to the main shaft for imparting rotation thereto; an auxiliary apparatus for steering the vehicle with a foot comprising a bracket mounted on the floor board in laterally adjacent spaced relation to the main steering shaft; an auxiliary steering shaft rotatably mounted in the bracket in substantially parallel relation to the main shaft; a substantially circular steering plate concentrically secured to the auxiliary shaft; a pin universally journaled in the steering plate in spaced relation to the auxiliary shaft for rotatable movement in a position substantially parallel to the auxiliary shaft and positions outwardly inclined therefrom; a foot receiving member having a toe end rigidly secured to the pin, a heel end adapted to extend over the steering plate, and a resiliently compressible member secured to the heel end adapted for frictional engagement with the plate upon movement of the foot receiving member toward the plate; and means interconnecting the auxiliary and main shafts for imparting rotation to the main shaft upon rotation of the auxiliary shaft.

5. In a vehicle having a floor board, an elongated rotatable main steering shaft providing an upper end, a lower end downwardly extended through the floor board, and a manually operable steering wheel connected to the upper end of the shaft for imparting rotation thereto; an auxiliary foot controlled steering apparatus comprising a substantially T-shaped support bracket laterally spaced from the main steering shaft including an upwardly arched upper cross member having opposite ends bolted to the floor board and a central portion spaced from the floor board, and a central member having an upper portion substantially parallel to the floor board secured to the central portion of the cross member and a downwardly inclined lower portion laterally adjustably bolted to the floor board; an auxiliary steering shaft rotatably journaled in the upper portion of the central member of the bracket in spaced substantially parallel relation to the main steering shaft having ends upwardly and downwardly extended from the bracket; a substantially circular foot steering plate concentrically secured to the upper end of the auxiliary shaft having an outer rim; a pin journaled for rotational movement in the steering plate adjacent to the rim thereof and for limited nutational movement from a position substantially parallel to the auxiliary shaft into position outwardly inclined therefrom; a foot-receiving slipper including an elongated, longitudinally rigid sole supporting portion having a toe end secured to the pin and a heel end adapted to extend over the plate, toe-receiving portions secured to the sole portion, and a heel-receiving portion secured to the sole portion; a downwardly extended heel pad of resiliently compressible material secured to the heel end of the sole portion of the slipper and downwardly extended therefrom adapted frictionally to engage the plate upon movement of the slipper toward the plate; a driven sprocket connected to the main steering shaft for rotation therewith; a driving sprocket secured to the lower end of the auxiliary shaft for rotation therewith; and an endless chain extended around the sprockets for transmitting rotation of the auxiliary shaft to the main shaft upon rotation of the foot steering plate.

6. In a vehicle having a steering mechanism, a steering plate, means mounting the steering plate in the vehicle for rotation about a predetermined axis of rotation, a control linkage interconnecting the steering plate and the steering mechanism whereby the steering mechanism is controlled by rotational positioning of the plate, a foot receiving slipper, and means rotatably journaling the slipper in the steering plate in radially spaced relation to the axis of rotation of the plate for rotation independently of the plate about an axis substantially parallel to the axis of rotation of the plate thereby to effect rotation of the plate in response to application of turning moment on the plate by the slipper.

7. In an apparatus having a controlled mechanism, a device for controlling the mechanism by foot comprising a support, a plate having driving connection to the mechanism, means mounting the plate in the support for rotation about a predetermined axis, the plate having portions radially outwardly extended from said axis of rotation, a foot receiving member having a toe end and a heel end, means rotatably connecting one end of the foot receiving member to one of the radially extended portions of the plate for free rotation of the foot receiving member independently of the plate around an axis in spaced substantially parallel relation to the axis of rotation of the plate, the other end of the foot receiving member extending across the plate to the opposite side of the axis of rotation of the plate from the end of the foot receiving member which is connected to the plate, said other end of the foot receiving member being freely movable toward and away from the plate between a position disengaged from the plate to permit said independent rotation and a position engaging the plate for enabling concurrent rotation of the plate and the foot receiving member.

8. In a vehicle having a steering mechanism; an apparatus for steering the vehicle by foot comprising a steering shaft rotatably mounted in the vehicle; means interconnecting the shaft and the steering mechanism for enabling operation of the mechanism incident to rotation of the shaft; a steering plate secured to the shaft and radially outwardly extended therefrom; a pin swivelly mounted in the plate in spaced relation to the shaft for rotatable movement between a position substantially parallel to the shaft and a position outwardly inclined therefrom; and a foot receiving member having a toe end secured to the pin, a heel end adapted to extend over the plate, and a resiliently compressible member secured to the heel end and adapted for frictional engagement with the plate upon movement toward the plate.

9. In a vehicle having a steering mechanism; an apparatus for steering the vehicle by foot comprising a steering shaft rotatably mounted in the vehicle; means interconnecting the shaft and the steering mechanism for enabling operation of the mechanism incident to rotation of the shaft; a steering plate secured to the shaft and radially outwardly extended therefrom; a pin journaled in the steering plate in spaced relation to the shaft for rotatable movement in a position substantially parallel to the shaft; and a foot receiving member having a toe end secured to the pin, a heel end adapted to extend over the plate, and a resiliently compressible member secured to the heel end and adapted for frictional engagement with the plate upon movement toward the plate.

10. In a vehicle having a steering mechanism, a substantially circular steering plate; means concentrically mounting the plate for rotatable movement in the vehicle, the plate being drivingly connected to the steering mechanism for operating the steering mechanism incident to rotation of the plate; a pin universally journaled in the steering plate in spaced relation to its axis of rotation for rotatable movement in a position substantially parallel to the axis of rotation of the plate and positions outwardly inclined therefrom; and a foot receiving member having a toe end rigidly secured to the pin, a heel end adapted to extend over the steering plate, and a resiliently compressible member secured to the heel end adapted for frictional engagement with the plate upon movement of the foot receiving member toward the plate.

11. An auxiliary steering mechanism for an automotive vehicle having a rotatable steering shaft and providing a driver compartment having a floor comprising a substantially flat steering plate rotatably mounted adjacent to the steering shaft, means interconnecting the steering plate and the steering shaft for corresponding rotational movement, a foot receiving member having a predetermined heel end portion and a predetermined toe end portion, and means rotatably mounting the toe end portion of the foot receiving member eccentrically on the steering plate, the heel end portion of the foot receiving member having plate engaging means thereon frictionally engageable with the plate and retractable therefrom.

References Cited in the file of this patent

UNITED STATES PATENTS

| | | |
|---|---|---|
| 1,432,379 | Bischoff | Oct. 17, 1922 |
| 2,542,410 | Hedges | Feb. 20, 1951 |
| 2,544,635 | Ostrow | Mar. 6, 1951 |
| 2,762,891 | Hill et al. | Sept. 11, 1956 |